United States Patent
Li et al.

(10) Patent No.: US 10,784,741 B2
(45) Date of Patent: Sep. 22, 2020

(54) COOLING STRUCTURE FOR ROTARY ELECTRIC MACHINE

(71) Applicant: HIWIN MIKROSYSTEM CORP., Taichung (TW)

(72) Inventors: Chen-An Li, Taichung (TW); Ruei-Bin Hsiao, Taichung (TW); Li-Wei Cheng, Taichung (TW)

(73) Assignee: HIWIN MIKROSYSTEM CORP., Taichung (TW)

( * ) Notice: Subject to any disclaimer, the term of this patent is extended or adjusted under 35 U.S.C. 154(b) by 123 days.

(21) Appl. No.: 16/106,508

(22) Filed: Aug. 21, 2018

(65) Prior Publication Data
US 2020/0067375 A1    Feb. 27, 2020

(51) Int. Cl.
*H02K 5/20*    (2006.01)
*H02K 9/19*    (2006.01)

(52) U.S. Cl.
CPC ............... *H02K 5/20* (2013.01); *H02K 9/19* (2013.01)

(58) Field of Classification Search
CPC .................................. H02K 5/20; H02K 9/19
USPC ........................................................ 310/54
See application file for complete search history.

(56) References Cited

U.S. PATENT DOCUMENTS

| | | | | |
|---|---|---|---|---|
| 3,521,094 A * | 7/1970 | Widder | ............... | H02K 9/19 310/58 |
| 6,900,561 B2 * | 5/2005 | Vlemmings | ............. | H02K 5/18 310/58 |
| 6,909,210 B1 * | 6/2005 | Bostwick | ............... | H02K 5/20 310/254.1 |
| 2005/0268464 A1 * | 12/2005 | Burjes | ............... | F28F 3/12 29/890.035 |
| 2008/0179972 A1 * | 7/2008 | Aoki | ............... | H01L 21/4878 310/52 |
| 2011/0234029 A1 * | 9/2011 | Pal | ............... | H02K 1/20 310/54 |
| 2012/0080965 A1 * | 4/2012 | Bradfield | ............... | H02K 1/20 310/58 |
| 2013/0126143 A1 * | 5/2013 | Sheu | ............... | F28F 1/00 165/177 |
| 2013/0126144 A1 * | 5/2013 | Sheu | ............... | F28F 1/00 165/181 |
| 2014/0246932 A1 * | 9/2014 | Chamberlin | ............. | H02K 9/19 310/54 |
| 2014/0246933 A1 * | 9/2014 | Chamberlin | ............. | H02K 9/19 310/54 |

(Continued)

*Primary Examiner* — Alex W Mok
(74) *Attorney, Agent, or Firm* — Muncy, Geissler, Olds & Lowe, P.C.

(57) ABSTRACT

A cooling structure for rotary electric machine is provided. The cooling structure for rotary electric machine comprises a sleeve, a plurality of dividers, a plurality of first walls and a plurality of second walls. The sleeve comprises an annular surface of a first half annular surface and a second half annular surface. The dividers are configured on the annular surface of the sleeve in parallel to provide multiple channels. The first walls are configured on the first half annular surface and between multiple corresponding dividers to provide multiple first division regions. The second walls are configured on the second half annular surface and between multiple corresponding dividers to provide multiple first division regions wherein the first division regions are asymmetric to the second division regions.

10 Claims, 9 Drawing Sheets

(56) References Cited

U.S. PATENT DOCUMENTS

| | | | |
|---|---|---|---|
| 2015/0130302 A1* | 5/2015 | Leberle | H02K 5/20 |
| | | | 310/54 |
| 2016/0056682 A1* | 2/2016 | Cocks | H02K 1/32 |
| | | | 310/59 |
| 2016/0294231 A1* | 10/2016 | Andres | H02K 1/20 |
| 2017/0012504 A1* | 1/2017 | Sever | H02K 5/18 |
| 2018/0174098 A1* | 6/2018 | Andres | H02K 5/20 |

* cited by examiner

COOLING STRUCTURE FOR ROTARY ELECTRIC MACHINE

BACKGROUND OF THE INVENTION

Field of the Invention

The invention relates to a cooling structure, and more particularly to a cooling structure for the rotary electric machine.

Description of the Related Art

As the development of the industrial automation, the rotary electric machine is widely applied to various machine tools for high speed rotation. With respect to the rotary electric machine, the iron loss of the stator and the copper loss of the coil result in the heat such that the deformation due to the heat would affect the accuracy of the machining during the operation of the rotary electric machine. Therefore, providing a jacket with a channel and injecting cooling liquid for heat exchange becomes the major means for heat dissipation of the rotary electric machine.

The conventional channel is designed as a non-cross and spiral channel wherein an inlet and an outlet are respectively configured at two ends of the channel such that the heat dissipation is achieved through the injection of the cooling liquid with the inlet and exhaust with the outlet. However, the continuous spiral channel has the cooling path with long distance, and the pressure drop occurs to result in that the fluid velocity of the cooling liquid is gradually decreased from the inlet to the outlet.

Consequently, mitigating the pressure drop within the channel to enhance the cooling efficiency through the modified channel structure becomes the challenge on heat dissipation of the rotary electric machine.

SUMMARY OF THE INVENTION

In view of the disadvantages of prior art, the object of the present invention is to provide a cooling structure for rotary electric machine with asymmetric first division regions and second division regions to form an interlaced path for the cooling liquid such that the cooling efficiency is enhanced. Besides, the channel design with descending number raises the fluid velocity of the cooling liquid and the thermal convection coefficient adjacent to the outlet to improve the heat exchange adjacent to the outlet such that the heat dissipation efficiency is enhanced.

To achieve the above object, the cooling structure for rotary electric machine comprises a sleeve, a plurality of dividers, a plurality of first walls and a plurality of second walls. The sleeve comprises an annular surface of a first half annular surface and a second half annular surface. The dividers are configured on the annular surface of the sleeve in parallel to provide multiple channels. The first walls are configured on the first half annular surface and between multiple corresponding dividers to provide multiple first division regions. The second walls are configured on the second half annular surface and between multiple corresponding dividers to provide multiple first division regions wherein the first division regions are asymmetric to the second division regions.

In one embodiment of the present invention, each first wall comprises an indentation to communicate the neighboring first division regions.

In one embodiment of the present invention, the indentation is in the form of curvy configuration.

In one embodiment of the present invention, the indentation is in the form of rectangular configuration.

In one embodiment of the present invention, the indentation comprises a bottom surface parallel to the annular surface and two end surfaces parallel with each other.

In one embodiment of the present invention, the cooling structure for rotary electric machine further comprises a jacket holding the sleeve and comprising an inlet and an outlet wherein the inlet and the outlet are configured on the opposite ends of the jacket and corresponding to the first division regions respectively.

In one embodiment of the present invention, the first division region corresponding to the inlet comprises a first channel number, and the second division region corresponding to the outlet comprises a second channel number. The first channel number is larger than the second channel number.

In one embodiment of the present invention, the first channel number is 1.5 times of the second channel number.

In one embodiment of the present invention, the width of the indentation is twice times as that of the channel.

In one embodiment of the present invention, the depth of the channel is twice times as that of the indentation.

Accordingly, the cooling structure for rotary electric machine with asymmetric first division regions and second division regions provides an interlaced path for the cooling liquid to enhance the cooling efficiency. Besides, the channel design with descending number raises the fluid velocity of the cooling liquid and the thermal convection coefficient adjacent to the outlet to improve the heat exchange adjacent to the outlet such that the heat dissipation efficiency is enhanced.

DETAILED DESCRIPTION OF THE PREFERRED EMBODIMENTS

Figure 1:
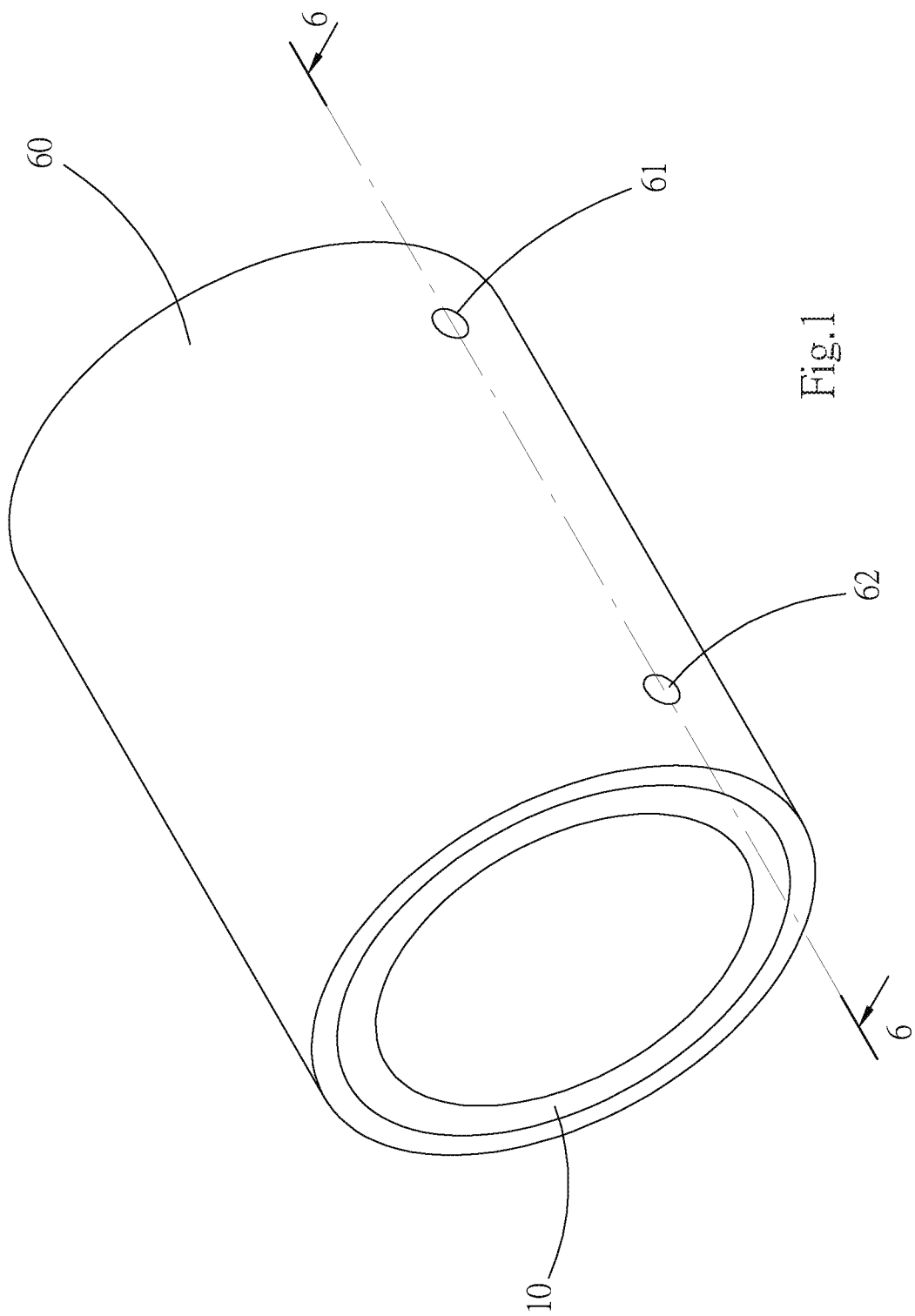
FIG. 1 is a schematic view of the cooling structure for rotary electric machine of the present invention.
Figure 2:
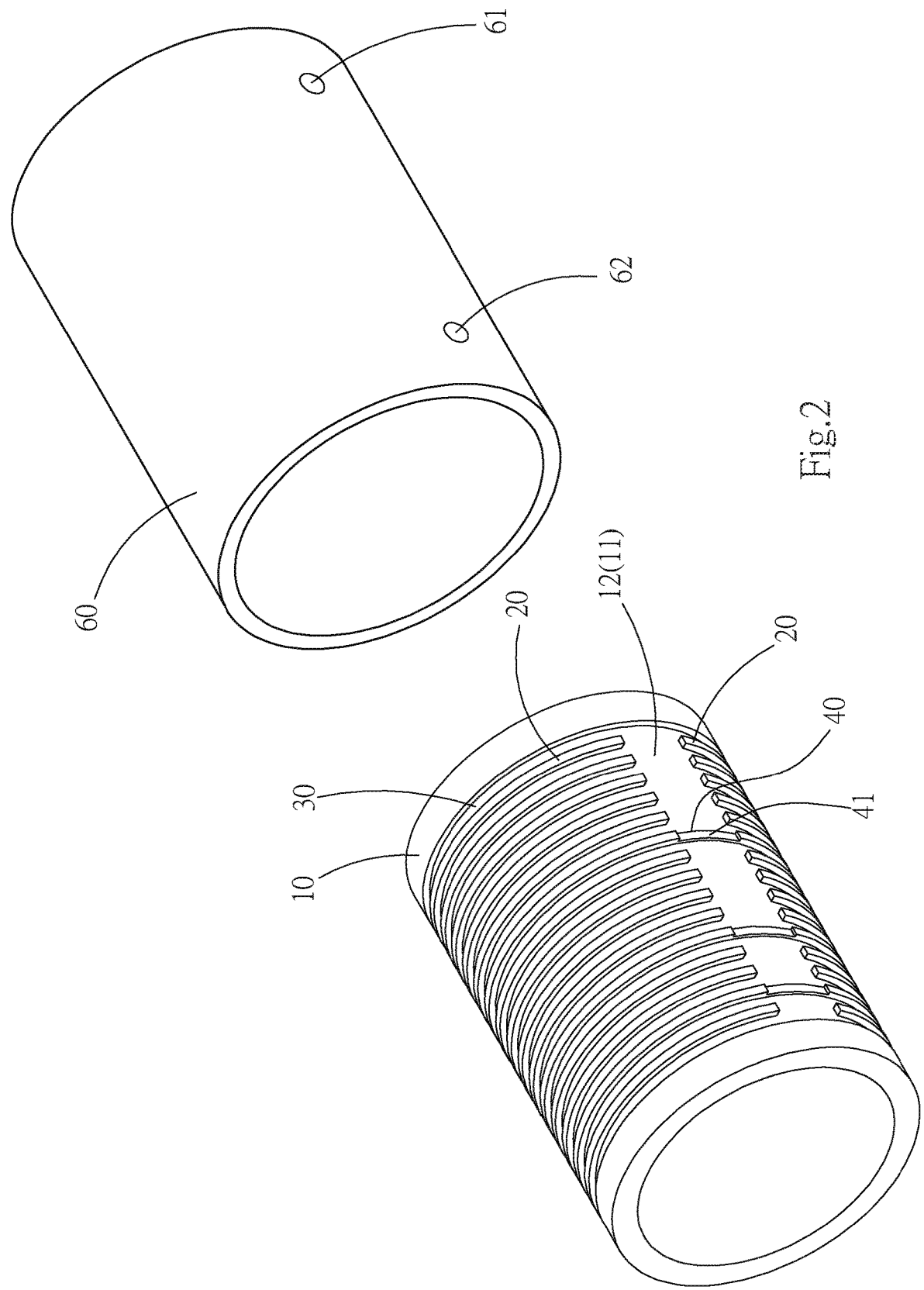
FIG. 2 is an exploded view of the cooling structure for rotary electric machine of the present invention.
Figure 3:
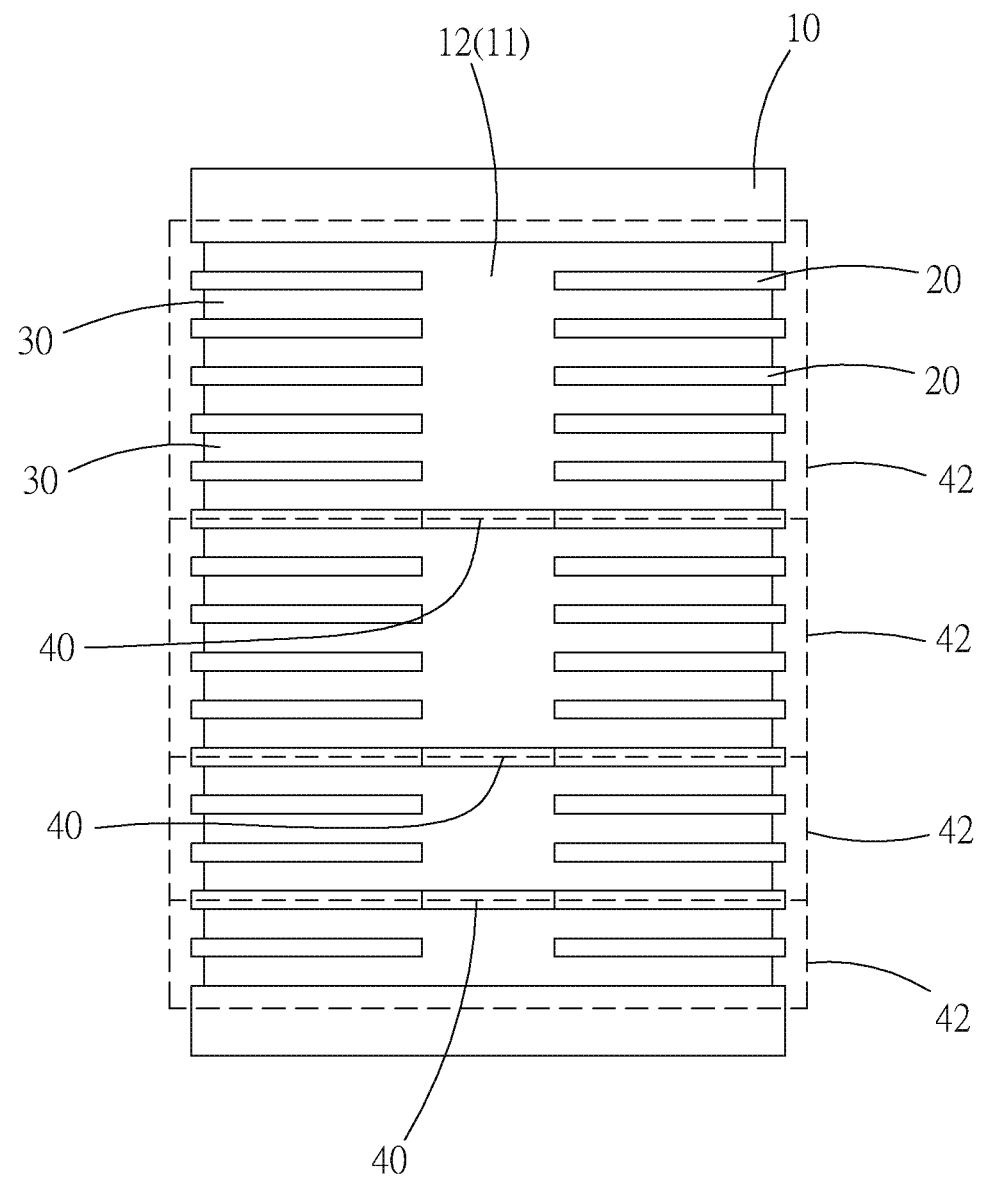
FIG. 3 is a plan view of the first half annular surface of the sleeve of the present invention.
Figure 4:
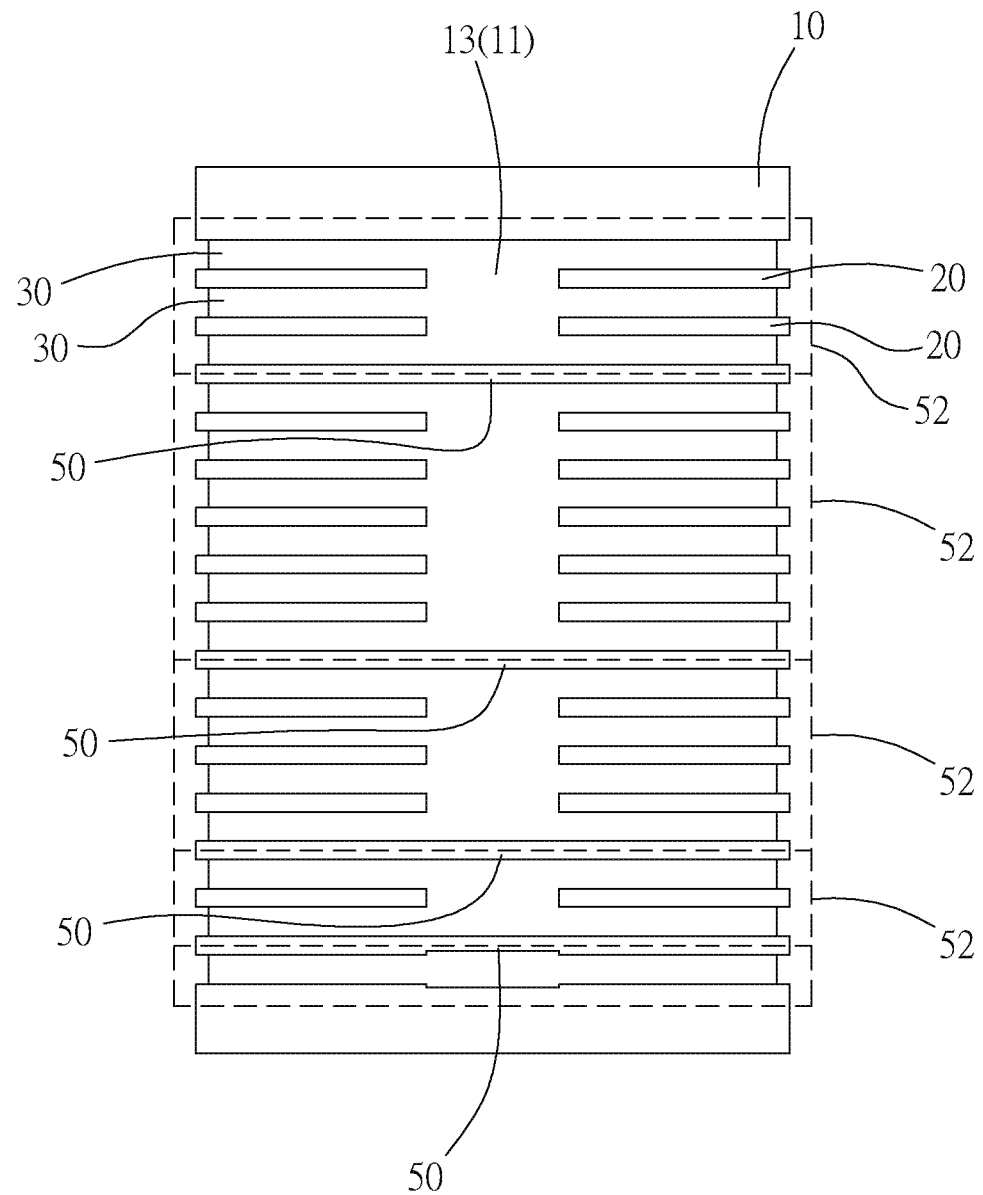
FIG. 4 is a plan view of the second half annular surface of the sleeve of the present invention.
Figure 5:
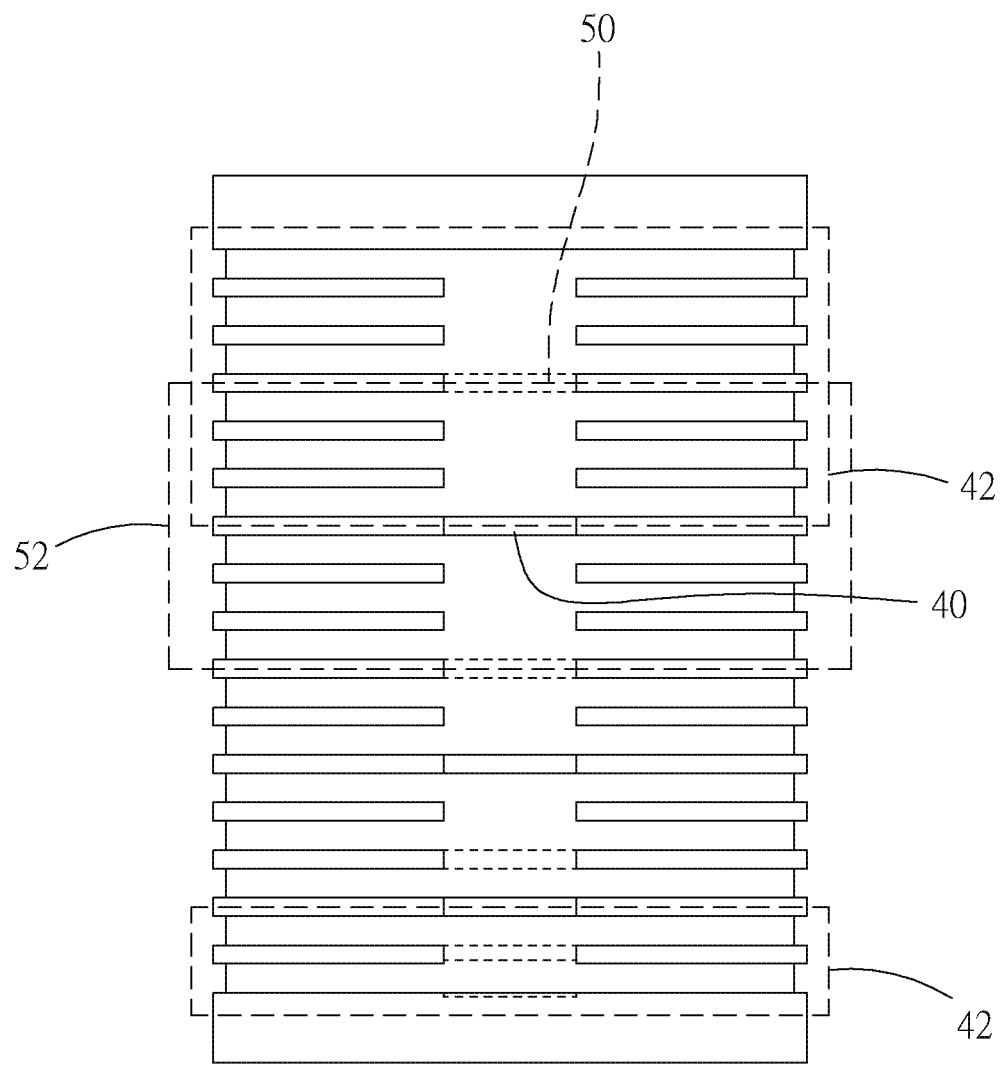
FIG. 5 is a schematic view of the sleeve illustrating the first division regions and the second division regions of the present invention.
Figure 6:
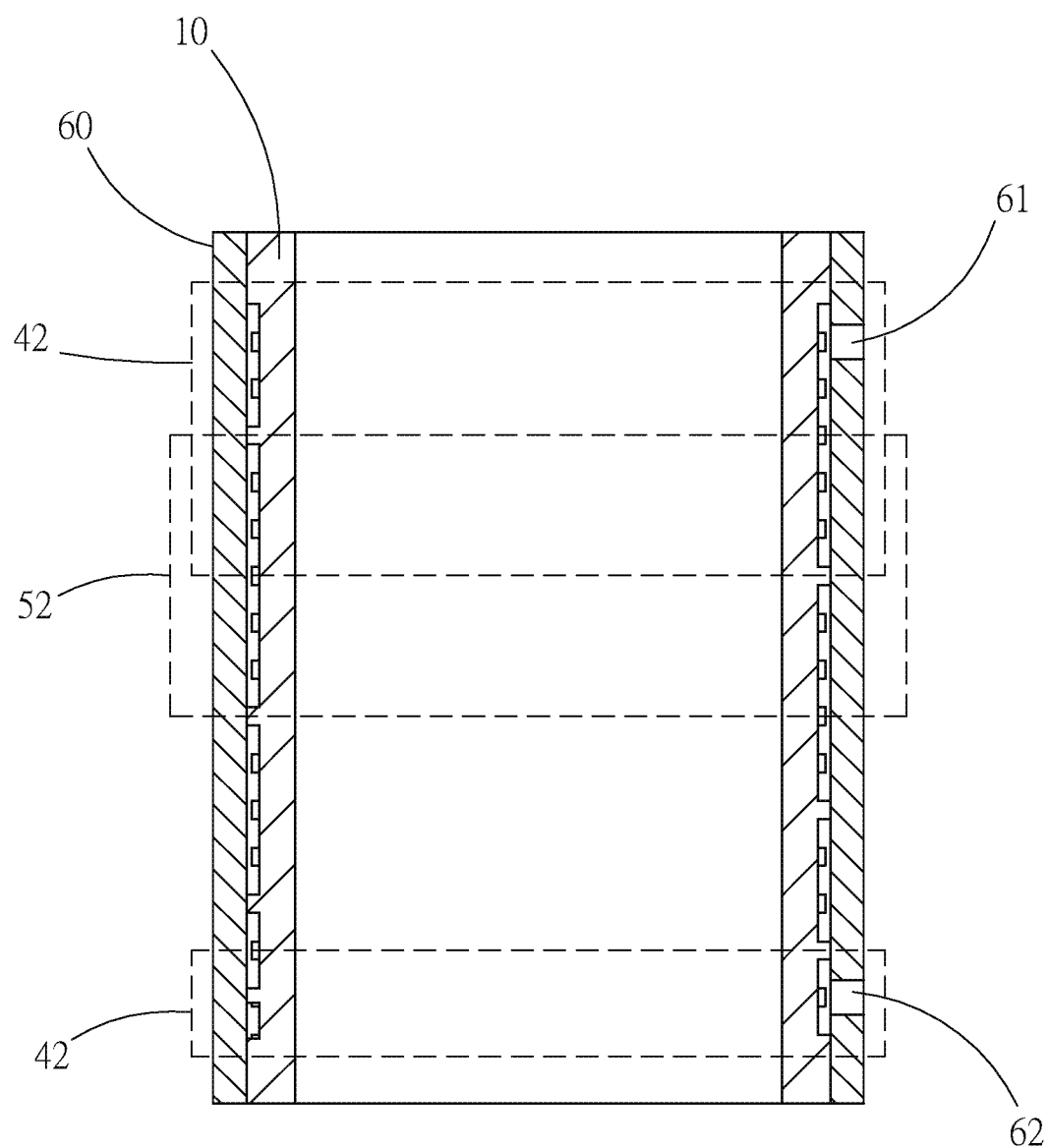
FIG. 6 is a sectional view along the sectional line 6-6 in FIG. 1.

Refer to FIG. 1 to FIG. 6. The cooling structure for rotary electric machine comprises a sleeve 10, a plurality of dividers 20, a plurality of first walls 40 and a plurality of second walls 50.

The sleeve 10 comprises an annular surface 11 with a first half annular surface 12 and a second half annular surface 13 symmetric with each other. The dividers 20 are configured on the annular surface 11 of the sleeve 10 to provide multiple channels 30.

The first walls 40 are configured on the first half annular surface 12 and between the corresponding dividers 20 to provide multiple first division regions 42. The second walls 50 are configured on the second half annular surface 13 and between the corresponding dividers 20 to provide multiple second division regions 52. The first division regions 42 on the first half annular surface 12 are asymmetric to the second division regions 52 on the second half annular surface 13.

In this embodiment, the cooling structure for rotary electric machine further comprises a jacket 60 holding the sleeve 10 and comprising an inlet 61 and an outlet 62. The inlet 61 and the outlet 62 are configured on the opposite ends of the jacket 60 and corresponding to the first division regions 42 respectively. There are four first division regions 42 on the first half annular surface 12 wherein the channel number of the four first division regions 42 are gradually decreased from the inlet 61 to the outlet 62. Specifically, the first division region 42 corresponding to the inlet 61 comprises six channels 30, and the next first division region 42 comprises five channels 30. The first division region 42 corresponding to the outlet 62 comprises two channels 30, and the next first division region 42 comprises three channels 30. The number of the channel disclosed above is merely described for illustration, and the channel number would meet the rule that the channel number of the first division region 42 corresponding to the inlet 61 is 1.5 times of the channel number of the first division region 42 corresponding to the outlet 62.

As described above, the cooling structure for rotary electric machine provides asymmetric first division regions 42 and second division regions 52 to form an interlaced path for the cooling liquid. Moreover, the channel design with descending number reduces the fluid velocity of the cooling liquid and the thermal convection coefficient adjacent to the inlet 61, and raises the fluid velocity of the cooling liquid and the thermal convection coefficient adjacent to the outlet 62. Compared with the prior continuous channel, the cooling structure for rotary electric machine of the present invention improves the heat exchange adjacent to the outlet 62 such that the heat dissipation efficiency of the rotary electric machine is enhanced.

Figure 7A:
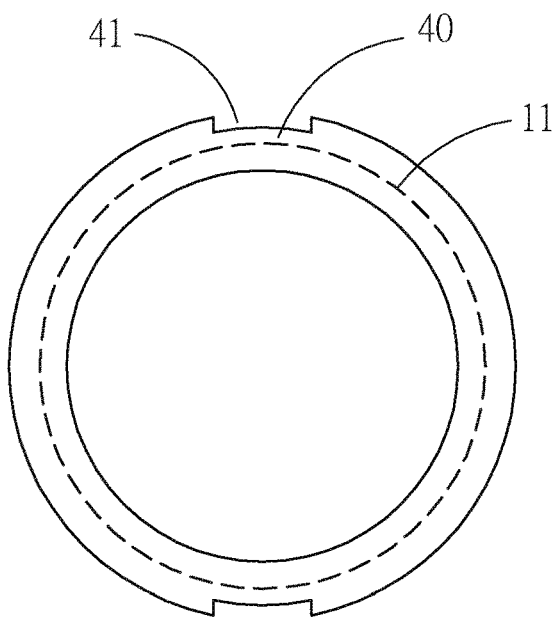
FIG. 7A is a schematic view of the indentation of the sleeve of the present invention.
Figure 7B:
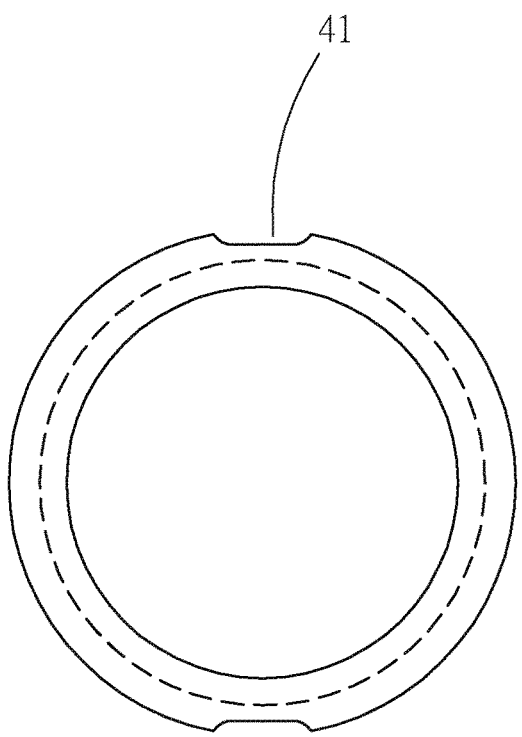
FIG. 7B is a schematic view of the indentation of the sleeve according to another embodiment of the present invention.
Figure 7C:
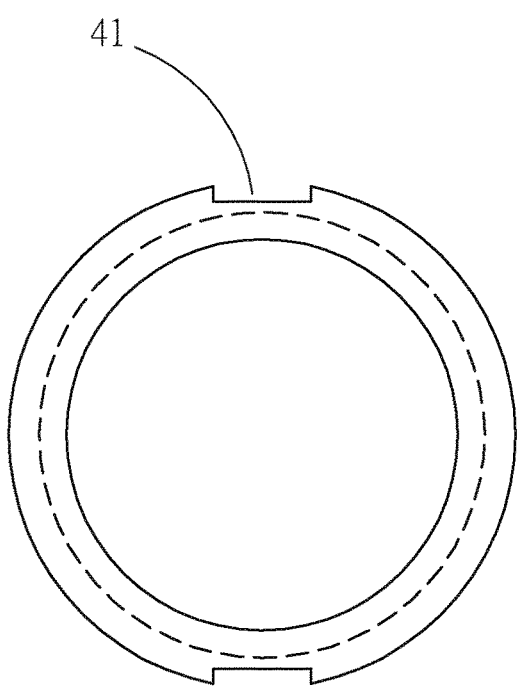
FIG. 7C is a schematic view of the indentation of the sleeve according to another embodiment of the present invention.

Refer to FIG. 7A to FIG. 7C illustrating the various embodiments of the indentation 41 of the first wall 40. Each of the first walls 40 comprises an indentation 41 communicating the neighboring first division regions 42 to prevent from disturbed flow on the first wall 40 and decrease pressure drop of the channel 30. In the embodiment shown in FIG. 7A, the indentation 41 comprises a bottom surface and two end surfaces wherein the bottom surface is parallel to the annular surface 11 and the two end surfaces are parallel with each other. In the embodiment shown in FIG. 7B, the indentation 41 is in the form of curvy configuration. In the embodiment shown in FIG. 7C, the indentation 41 is in the form of rectangular configuration. The indentation configuration disclosed above are merely described for illustration wherein the communication area should be designed according to the decrease degree of the pressure drop.

Figure 8A:
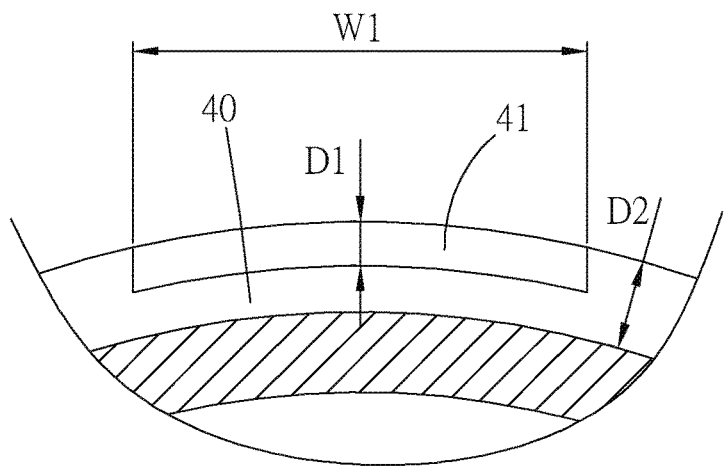
FIG. 8A is a schematic view of the indentation illustrating the width and the depth thereof.
Figure 8B:
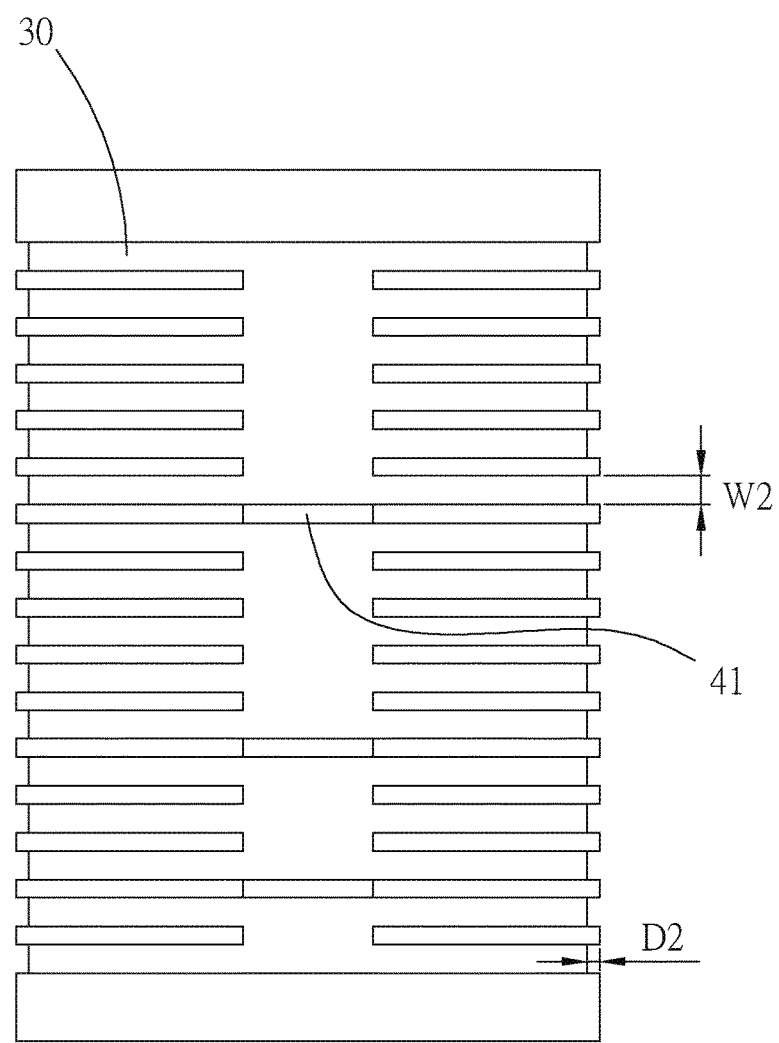
FIG. 8B is a schematic view of the channel illustrating the width and the depth thereof.
Figure 9:
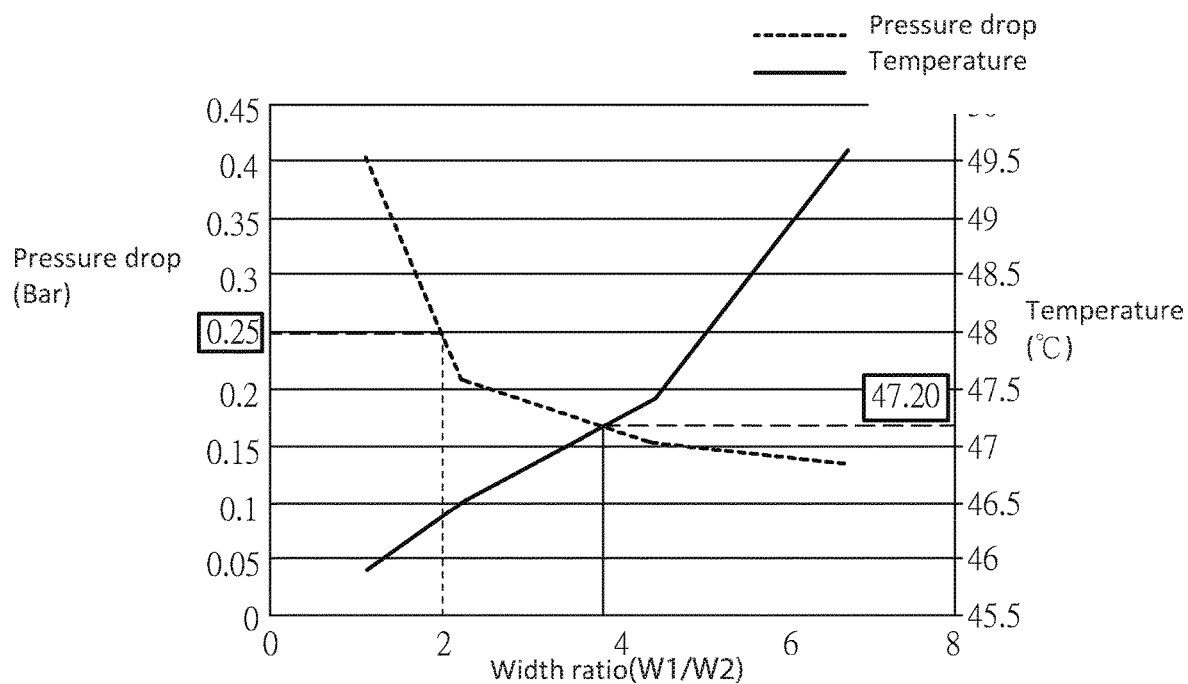
FIG. 9 is a chart illustrating the variation of the pressure drop and the temperature depending on the width ratio of the indentation and the channel.
Figure 10:
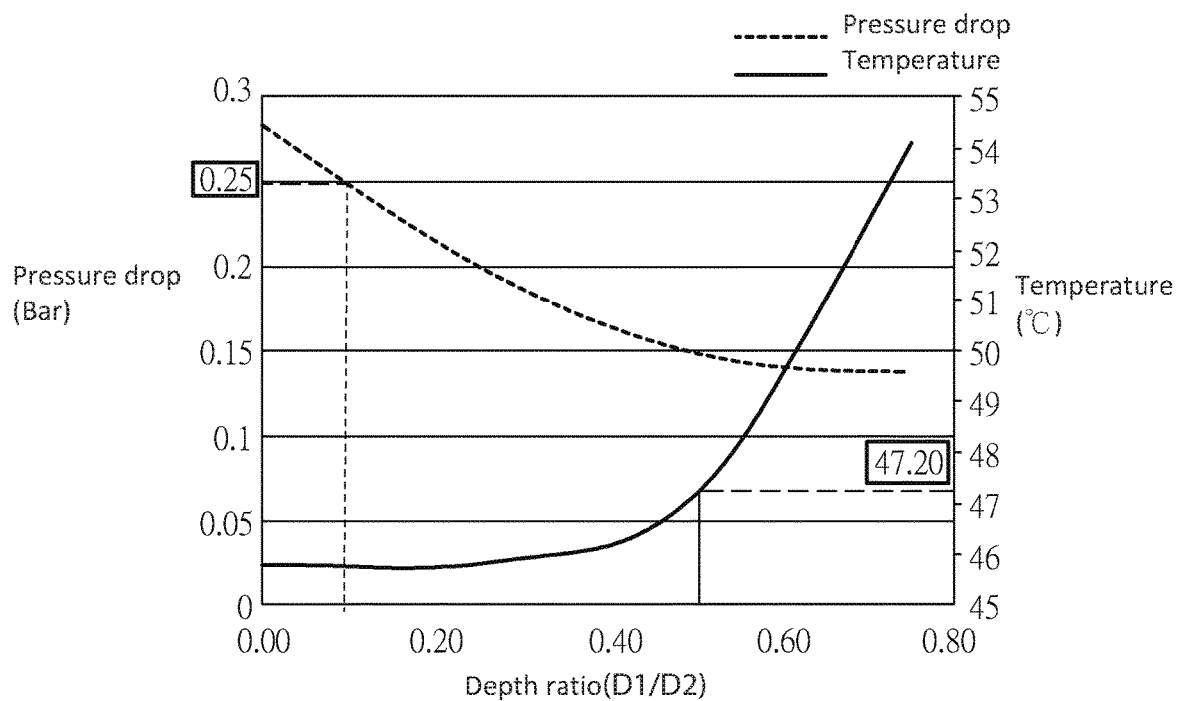
FIG. 10 is a chart illustrating the variation of the pressure drop and the temperature depending on the depth ratio of the indentation and the channel.

Refer to FIG. 8 to FIG. 10. FIG. 8A and FIG. 8B illustrate the width W1 and the depth D1 of the indentation 41 and the width W2 and the depth D2 of the channel 30 respectively. FIG. 9 discloses a chart illustrating the variation of the pressure drop and the temperature depending on the width ratio of the indentation 41 and the channel 30. FIG. 10 discloses a chart illustrating the variation of the pressure drop and the temperature depending on the depth ratio of the indentation 41 and the channel 30. The pressure drop can be reduced to raise heat dissipation when the width W1 of the indentation 41 is twice to four times as the width W2 of the channel 30 or the depth D1 of the channel 30 is twice times as the depth D2 of the indentation 41.

Consequently, the cooling structure for rotary electric machine of the present invention includes the following advantages:

1. Compared with the prior continuous channel with the longer cooling path resulting in increasing pressure drop and decreasing the cooling efficiency, the cooling structure for rotary electric machine provides asymmetric first division regions 42 and second division regions 52 to form an interlaced path for the cooling liquid such that the cooling efficiency is enhanced. Moreover, the channel design with descending number raises the fluid velocity of the cooling liquid and the thermal convection coefficient adjacent to the outlet 62 to improve the heat exchange adjacent to the outlet 62 such that the heat dissipation efficiency is enhanced.

2. The first walls 40 comprises an indentation 41 communicating the neighboring first division regions 42 to prevent from disturbed flow on the first wall 40 and decrease pressure drop of the channel 30. In addition, the communication area between the neighboring first division regions 42 and the capacity of the channel 30 are designed to decrease pressure drop by optimizing the width or depth ratio between the channel 30 and the indentation 41.

It is to be understood that the above descriptions are merely the preferable embodiment of the present invention and are not intended to limit the scope of the present invention. Equivalent changes and modifications made in the spirit of the present invention are regarded as falling within the scope of the present invention.

What is claimed is:

1. A cooling structure for rotary electric machine, comprising:

a sleeve, comprising an annular surface of a first half annular surface and a second half annular surface, each of the first half annular surface and the second half annular surface having a same length as the sleeve and being a half-circle in a transverse cross section;

a plurality of dividers, configured on the annular surface of the sleeve in parallel to provide multiple channels;

a plurality of first walls, configured on the first half annular surface and between multiple corresponding dividers to provide multiple first division regions; and a plurality of second walls, configured on the second half annular surface and between multiple corresponding dividers to provide multiple second division regions wherein the first division regions are asymmetric to the second division regions.

2. The cooling structure for rotary electric machine as claimed in claim 1, wherein each of the first walls comprises an indentation to communicate the neighboring first division regions.

3. The cooling structure for rotary electric machine as claimed in claim 2, wherein the indentation is in the form of curvy configuration.

4. The cooling structure for rotary electric machine as claimed in claim 2, wherein the indentation is in the form of rectangular configuration.

5. The cooling structure for rotary electric machine as claimed in claim 2, wherein the indentation comprises a bottom surface parallel to the annular surface and two end surfaces parallel with each other.

6. The cooling structure for rotary electric machine as claimed in claim 2, wherein a width of the indentation is twice times as a width of the channel.

7. The cooling structure for rotary electric machine as claimed in claim 2, wherein a depth of the channel is twice times as a depth of the indentation.

8. The cooling structure for rotary electric machine as claimed in claim 1, further comprising a jacket holding the sleeve and comprising an inlet and an outlet wherein the inlet and the outlet are configured on the opposite ends of the jacket and corresponding to the first division regions respectively.

9. The cooling structure for rotary electric machine as claimed in claim 8, wherein the first division region corresponding to the inlet comprises a first channel number, and the second division region corresponding to the outlet comprises a second channel number; the first channel number is larger than the second channel number.

10. The cooling structure for rotary electric machine as claimed in claim 9, wherein the first channel number is 1.5 times of the second channel number.

* * * * *